United States Patent
Nojiri (10) Patent No.: US 10,627,735 B2
(45) Date of Patent: Apr. 21, 2020

(54) CHARGING ROLLER AND METHOD OF PRODUCING THE SAME

(71) Applicant: SUMITOMO RUBBER INDUSTRIES, LTD., Hyogo (JP)

(72) Inventor: Kazuki Nojiri, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 16/382,152

(22) Filed: Apr. 11, 2019

(65) Prior Publication Data

US 2019/0317422 A1  Oct. 17, 2019

(30) Foreign Application Priority Data

Apr. 16, 2018 (JP) ................ 2018-078533

(51) Int. Cl.
*G03G 15/02* (2006.01)
*C08L 23/16* (2006.01)

(52) U.S. Cl.
CPC .......... *G03G 15/0233* (2013.01); *C08L 23/16* (2013.01); *G03G 2215/021* (2013.01)

(58) Field of Classification Search
CPC .......... G03G 15/0233; G03G 15/0818; G03G 15/1685; G03G 2215/021; G03G 2215/0861; G03G 2215/1614; C08L 23/16
USPC ............... 399/176, 286, 313; 492/18, 53, 56
See application file for complete search history.

(56) References Cited

U.S. PATENT DOCUMENTS

| 6,703,094 | B2 * | 3/2004 | Kakii | G03G 15/0233 |
| | | | | 361/225 |
| 6,810,225 | B2 * | 10/2004 | Kitano | G03G 15/0233 |
| | | | | 399/176 |
| 9,280,079 | B1 * | 3/2016 | Hoshio | G03G 15/0233 |
| 10,345,735 | B2 * | 7/2019 | Nojiri | G03G 15/0818 |
| 2006/0183615 | A1 * | 8/2006 | Eun | G03G 15/0233 |
| | | | | 492/56 |
| 2008/0146427 | A1 * | 6/2008 | Osaku | G03G 15/0233 |
| | | | | 492/56 |
| 2010/0080611 | A1 * | 4/2010 | Kurachi | G03G 15/0818 |
| | | | | 399/111 |

FOREIGN PATENT DOCUMENTS

| JP | 07152267 | A | * | 6/1995 |
| JP | 2008051865 | | | 3/2008 |
| JP | 2008058622 | A | * | 3/2008 |
| JP | 2009244667 | | | 10/2009 |

* cited by examiner

Primary Examiner — Robert B Beatty
(74) Attorney, Agent, or Firm — JCIP Global Inc.

(57) ABSTRACT

A charging roller has a roller main body including a cylindrical inner layer having a porous structure formed of a semiconductive rubber composition constituted by ethylene propylene rubber, paraffin oil, and a carbon black having a DBP oil absorption amount of 400 $cm^3/100$ g or more and an outer layer constituted by a nonporous and seamless semiconductive tube including a polyurethane thermoplastic elastomer having a type A durometer hardness of 93 or less, carbon black, and crosslinked PMMA particles having an average particle size of 5 to 20 μm. The production method includes a process in which a semiconductive rubber composition forming the inner layer is foamed with OBSH.

15 Claims, 1 Drawing Sheet

CHARGING ROLLER AND METHOD OF PRODUCING THE SAME

CROSS-REFERENCE TO RELATED APPLICATION

This application claims the priority of Japan patent application serial no. 2018-078533, filed on Apr. 16, 2018. The entirety of the above-mentioned patent application is hereby incorporated by reference herein and made a part of this specification.

BACKGROUND

Technical Field

The disclosure relates to a charging roller incorporated into an image forming device using electrophotography and a method of producing the same.

Description of Related Art

In image forming devices using electrophotography such as a laser printer, an electrostatic copying machine, a plain paper facsimile machine, and a complex machine thereof, a charging roller is generally used to charge a photoreceptor.

As the charging roller, for example, a charging roller including a nonporous and single-layer semiconductive roller main body that is formed by molding a crosslinkable rubber composition having electron conductivity and/or ion conductivity into a cylindrical shape, and then crosslinking the rubber is generally used.

Regarding a toner used for image formation through electrophotography, in order to adjust fluidity, electrostatic properties, and other characteristics of the toner, microparticles of silica, titanium oxide, or the like may be externally added as external additives.

However, when image formation is repeated using the toner, external additives that have dropped from the toner, fragments generated when toner particles are pulverized, paper powder generated from paper, and the like tend to adhere to the surface of the photoreceptor as dust.

The adhered dust cannot be completely removed even if the surface of the photoreceptor is cleaned whenever one image is formed, and remains on the surface.

In addition, the dust that is not completely removed and remains on the surface of the photoreceptor is moved to the outer circumferential surface of the roller main body of the charging roller that is constantly in contact with the surface and gradually accumulates on the outer circumferential surface while image formation is repeated.

When dust accumulates on the outer circumferential surface of the roller main body, it is not possible to favorably charge the photoreceptor, the accumulated dust adheres to the formed images, which causes image defects, and image quality of the formed images deteriorates.

Particularly, the outer circumferential surface of a roller main body of a single layer described above is generally finished to have a predetermined surface roughness according to polishing and the like. However, in this case, since fine irregularities in the polished texture occur on the outer circumferential surface, dust easily adheres to and accumulates on the irregularities, and the above problems easily occur.

Thus, it is conceivable that the outer circumferential surface of the semiconductive roller be covered with a coating film made of, for example, a urethane resin, to improve lubricity, and thus adhesion of dust be minimized.

However, the coating film is generally formed by applying a liquid coating agent forming the coating film to the outer circumferential surface of the semiconductive roller according to a coating method such as a spray method or a dipping method and then drying it. Therefore, various defects such as foreign substances such as dust mixed in during formation of the coating film and the occurrence of an irregular thickness are likely to occur.

In addition, when such effects occur, there are problems that it may not be possible to uniformly charge the surface of the photoreceptor during use as a charging roller, image defects such as an uneven density being likely to occur in formed images, and image quality of the formed images deteriorating.

In addition, an organic solvent is necessary to prepare the coating agent. However, when an organic solvent is used, an environmental burden increases. Therefore, there is a problem that this is contrary to the current trend of reducing volatile organic compounds (VOC).

In addition, as the resin forming the coating film, it is necessary to select and use a resin having excellent solubility in an organic solvent. However, since such a resin may not have sufficient strength, abrasion resistance, and the like in many cases, the strength, abrasion resistance, and the like of the coating film also tend to be insufficient.

Then, when the strength, abrasion resistance, and the like are insufficient, there is a problem of the coating film wearing off in a short time and losing its effect.

Therefore, a configuration of a roller main body in which a cylindrical component formed of a rubber composition to which semiconductivity is imparted is set as an inner layer and substantially the entire outer circumferential surface of the inner layer is covered with an outer layer constituted by a nonporous and seamless semiconductive resin tube has been proposed (Patent Documents 1 and 2 and the like).

In this configuration, since the outer circumferential surface of the outer layer is formed as a surface of a tube which is formed by extruding and molding a resin, is smooth, and has no fine irregularities in a polished texture, it is possible to improve the lubricity and minimize adhesion of dust.

In addition, since the tube is formed by extruding and molding a resin as described above, there is no need to use an organic solvent when the tube is formed, and foreign substances such as dust are unlikely to be mixed into the formed tube, and an irregular thickness, and the like are unlikely to occur.

In addition, regarding the resin forming the tube, it is not necessary to consider solubility in an organic solvent and the like, and any resin having excellent strength, abrasion resistance, and the like can be selected and used.

Therefore, according to the above configuration, it is expected that the lubricity of the outer circumferential surface of a roller main body will be able to be improved and adhesion and accumulation of dust will be able to minimized without causing problems as in a coating film formed of a liquid coating agent.

In addition, in Patent Document 2, fine resin particles are incorporated into a matrix resin forming the tube.

According to this configuration, it is expected that the surface roughness of the outer circumferential surface of the roller main body which is a surface of an outer layer formed of a tube will be able to be adjusted and adhesion of dust to the outer circumferential surface will be able to be minimized more favorably.

In addition, the inner layer has a porous structure so that it is possible to improve the flexibility of the entire roller main body, secure a nip width with the photoreceptor, and accordingly, favorably charge the photoreceptor, prevent the occurrence of image defects due to non-uniform charging, and improve image quality of formed images.

[Patent Document 1] Japanese Patent Laid-Open No. 2008-51865

[Patent Document 2] Japanese Patent Laid-Open No. 2009-244667

Incidentally, according to studies performed by the inventors, it has been found that, in both charging rollers having a roller main body having a 2-layer structure of an inner layer and an outer layer of the related art, such as those described in Patent Documents 1 and 2, research regarding the combination of formation materials for the two layers is still insufficient and there is still room for further improvement therein.

The disclosure provides a charging roller including a roller main body including an inner layer having a porous structure and an outer layer formed of a nonporous and seamless tube and having various characteristics which are improved with respect to the current situation, and a method of producing the same.

SUMMARY

According to an embodiment of the disclosure, there is provided a charging roller, including: a roller main body including a cylindrical inner layer having a porous structure formed of a semiconductive rubber composition constituted by ethylene propylene rubber, paraffin oil, and a carbon black having a DBP oil absorption amount of 400 $cm^3$/100 g or more and an outer layer which is provided on the outer circumference of the inner layer and constituted by a nonporous and seamless semiconductive tube including a polyurethane thermoplastic elastomer having a type A durometer hardness according to the Japanese Industrial Standard JIS $K7311_{-1995}$ of 93 or less at a measurement temperature of 23° C., carbon black, and crosslinked poly(methyl methacrylate) particles having an average particle size of 5 μm or more and 20 μm or less.

In addition, according to an embodiment of the disclosure, there is provided a method of producing the charging roller according to the disclosure, including a process in which the inner layer is foamed by thermal decomposition of 4,4'-oxybisbenzenesulfonyl hydrazide as a foaming agent contained in the semiconductive rubber composition such that it has a porous structure.

DESCRIPTION OF THE EMBODIMENTS

According to the disclosure, it is possible to provide a charging roller including a roller main body including an inner layer having a porous structure and an outer layer formed of a nonporous and seamless tube and having various characteristics which are improved with respect to the current situation, and a method of producing the same.

Figure 1A:
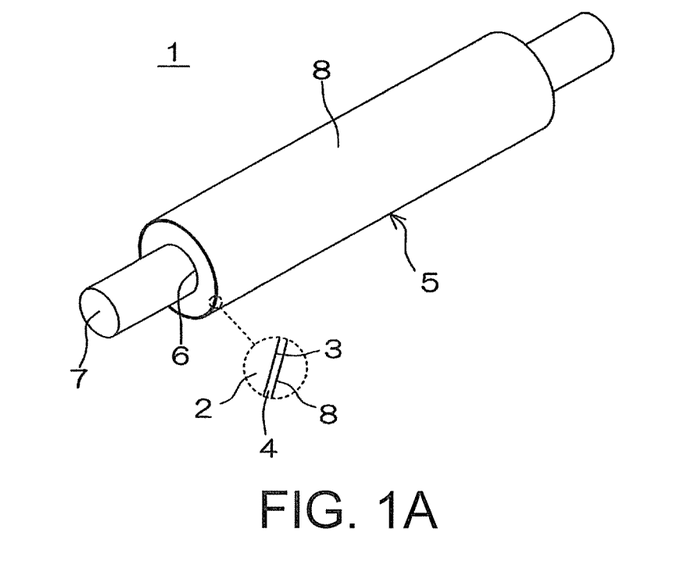
FIG. 1A is a perspective view of an example of a charging roller according to an embodiment of the disclosure.
Figure 1B:
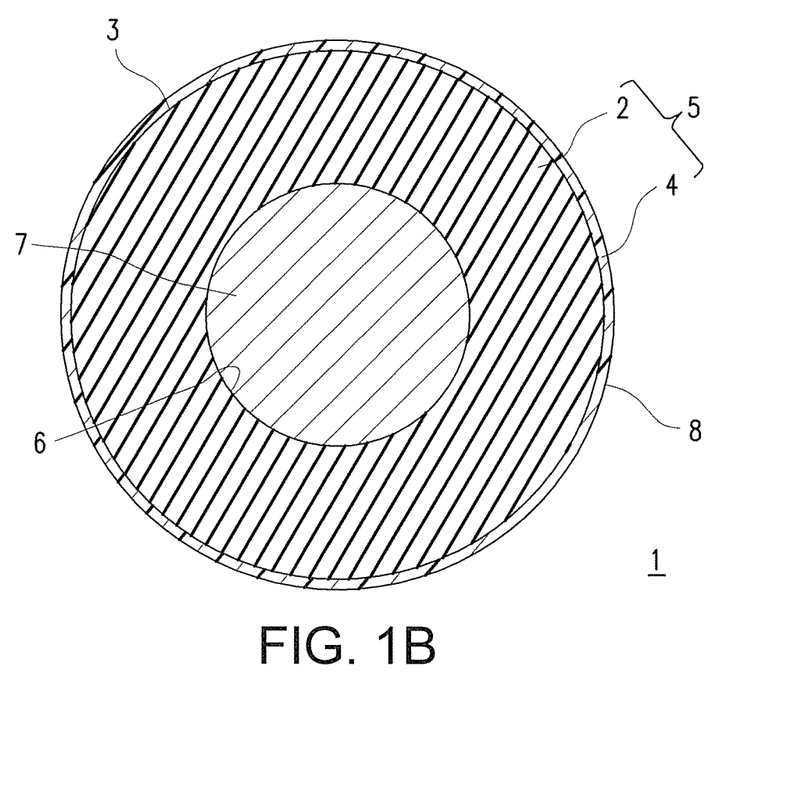
FIG. 1B is an end view of the charging roller of the example.

FIG. 1A is a perspective view of an example of a charging roller according to an embodiment of the disclosure, and FIG. 1B is an end view of the charging roller of the example.

With reference to FIGS. 1A and 1B, the charging roller 1 of the example includes a roller main body 5 having a 2-layer structure in which an outer layer 4 constituted by a nonporous and seamless semiconductive tube is laminated on an outer circumferential surface 3 of a cylindrical inner layer 2 formed of a semiconductive rubber composition and having a porous structure. A shaft 7 is inserted into and fixed to a through-hole 6 at the center of the inner layer 2.

The semiconductive rubber composition forming the inner layer 2 includes ethylene propylene rubber, paraffin oil, and carbon black.

Since ethylene propylene rubber having excellent affinity and compatibility with paraffin oil is selected and combined with the paraffin oil, a melt viscosity of the semiconductive rubber composition is lowered and the semiconductive rubber composition can be easily foamed.

Therefore, it is possible to improve the flexibility of the inner layer 2, and consequently the flexibility of the entire roller main body 5 compared with that of the current situation by increasing the foaming rate at which the semiconductive rubber composition is foamed and crosslinked.

Therefore, a sufficient nip width between the roller main body 5 and the photoreceptor is secured, and accordingly, the photoreceptor is favorably charged, it is possible to prevent the occurrence of image defects due to non-uniform charging more favorably, and it is possible further improve image quality of formed images.

In addition, when carbon black having electron conductivity is incorporated, appropriate semiconductivity can be imparted to the semiconductive rubber composition, and the roller resistance value of the charging roller 1 can be reduced to a range suitable for the charging roller 1.

However, regarding the carbon black, it is necessary to select and use a carbon black having a DBP oil absorption amount of 400 $cm^3$/100 g or more.

Carbon black forms conductive circuits when aggregates are bonded together to form an agglomerate. Since a porosity with respect to respective aggregates has a positive correlation with the structure, carbon black having a larger structure allows a higher conductivity to be obtained when a smaller amount is added.

The structure of carbon black can be indirectly quantified according to a DBP oil absorption amount.

According to studies performed by the inventors, a carbon black having a DBP oil absorption amount that is below the above range and having a small structure needs to be added in a large amount in order to impart appropriate semiconductivity to the semiconductive rubber composition and lower the roller resistance value of the charging roller 1 to a suitable range.

Incidentally, when an amount of carbon black added increases, a melt viscosity of the semiconductive rubber composition increases accordingly. Therefore, a large amount of paraffin oil needs to be added in order to lower the melt viscosity and allow the semiconductive rubber composition to be easily foamed.

However, since paraffin oil is insulative and has a contradictory relationship with respect to carbon black in terms of the roller resistance value of the charging roller 1, it is difficult to achieve a balance between the amounts in which these are added.

In addition, since a large amount of carbon black and paraffin oil is necessary, production costs of the inner layer 2 formed of the semiconductive rubber composition, and consequently the charging roller 1 are high.

On the other hand, when a developed carbon black having a structure having a DBP oil absorption amount of 400 cm³/100 g or more is used, as can be seen from the mechanism for forming a conductive circuit described above, it is possible to impart appropriate semiconductivity to the semiconductive rubber composition when a smaller amount thereof is added.

Thus, it is possible to lower the roller resistance value of the charging roller 1 to a suitable range.

In addition, an amount of paraffin oil added necessary for lowering the melt viscosity and allowing the semiconductive rubber composition to be easily foamed is reduced. Therefore, it is possible to easily achieve a balance between the amounts in which these are added and minimize increase in production costs of the charging roller 1.

In addition to the inner layer 2, a nonporous and seamless tube forming the outer layer 4 constituting the roller main body 5 of the charging roller 1 contains a polyurethane thermoplastic elastomer, carbon black, and crosslinked poly (methyl methacrylate) particles. Hereinafter, crosslinked poly(methyl methacrylate) particles will be abbreviated as "crosslinked PMMA particles" in some cases.

As described above, the tube can be formed by, for example, extrusion and molding, and, as the polyurethane thermoplastic elastomer forming the base thereof, those having excellent strength, abrasion resistance, and the like can be selected and used if there is no need to consider solubility in an organic solvent and like.

Therefore, as well as there being a nonporous structure for the tube, for example, the outer layer 4 having high strength and excellent abrasion resistance can be formed unlike a coating film made of a liquid coating agent that wears off in a short time and loses its effect.

Therefore, when the outer layer 4 formed of the above tube is provided, it is possible to make the above effects last for a longer time.

In addition, the polyurethane thermoplastic elastomer has high polarity and has low affinity and compatibility with ethylene propylene rubber and paraffin oil.

Therefore, when the tube forming the outer layer 4 is formed in a nonporous and seamless state of the polyurethane thermoplastic elastomer, the outer layer 4 can function as a barrier layer with respect to paraffin oil.

Therefore, it is possible to minimize bleeding of paraffin oil added to the inner layer 2 on a surface of the outer layer 4, that is, an outer circumferential surface 8 of the roller main body 5, and contaminating the photoreceptor and the like.

Here, even if other thermoplastic elastomers having high polarity such as polyesters and polyamides are used, an outer layer that can function as a barrier layer can be formed in the same manner.

However, since a polyurethane thermoplastic elastomer has superior abrasion resistance compared with the other thermoplastic elastomers, when such a polyurethane thermoplastic elastomer is selected and used, the outer layer 4 having higher strength and excellent abrasion resistance can be formed.

However, as the polyurethane thermoplastic elastomer, those having a type A durometer hardness of 93 or less at a measurement temperature of 23° C. need to be selected and used.

When carbon black or crosslinked PMMA particles are added to a hard polyurethane thermoplastic elastomer having a type A durometer hardness that exceeds the above range, the tube becomes harder, and the flexibility of the outer layer 4 becomes insufficient.

Therefore, for example, the flexibility of the roller main body 5 deteriorates even with a combination with the inner layer 2 having a porous structure described above.

On the other hand, when a polyurethane thermoplastic elastomer having a type A durometer hardness that is within the above range is used, even if carbon black or crosslinked PMMA particles are added, hardening of the tube is minimized, and suitable flexibility can be imparted to the outer layer 4.

Therefore, when the outer layer 4 is combined with the inner layer 2 having a porous structure, it is possible to further improve the flexibility of the roller main body 5.

Therefore, a sufficient nip width between the roller main body 5 and the photoreceptor is secured, and accordingly, the photoreceptor is favorably charged, it is possible to prevent the occurrence of image defects due to non-uniform charging more favorably, and it is possible further improve image quality of formed images.

In addition, when carbon black having electron conductivity is selected and used in order to impart semiconductivity to the tube, compared to a case in which a conductive agent having ion conductivity is used, it is possible to reduce fluctuation in a roller resistance value of the charging roller 1 due to differences in usage environments, that is, differences in the temperature and humidity.

Therefore, the roller resistance value of the charging roller 1 can be made constantly stable.

In addition, crosslinked PMMA particles have excellent heat resistance and pressure resistance, and even if high heat or pressure is applied, they are not easily melted, crushed, or deformed unlike, for example, uncrosslinked polystyrene particles and uncrosslinked acrylic resin particles.

That is, when a polyurethane thermoplastic elastomer and carbon black are kneaded to prepare an elastomer composition and even when an elastomer composition is extruded and molded to form a tube, crosslinked PMMA particles are not melted, crushed, or deformed, and the shape of particles can be maintained.

Therefore, when crosslinked PMMA particles are added to the elastomer composition, the surface roughness of the outer circumferential surface 8 of the roller main body 5 which is a surface of the outer layer 4 formed of a tube is adjusted, and thereby it is possible to minimize adhesion of dust to the outer circumferential surface 8 more favorably.

In addition, according to studies performed by the inventors, since protrusions formed on the outer circumferential surface 8 of the roller main body 5 with the crosslinked PMMA particles serve as starting points for discharging and function to charge the photoreceptor, the photoreceptor can be favorably charged.

However, as the crosslinked PMMA particles, those having an average particle size of 5 μm or more and 20 μm or less need to be selected and used.

When the average particle size of crosslinked PMMA particles is below the above range, since the surface roughness of the outer circumferential surface 8 of the roller main body 5 which is a surface of the outer layer 4 formed of a tube is insufficient, dust is easily adhered to and accumulates on the outer circumferential surface 8.

In addition, it is not possible to form appropriate protrusions serving as the starting points for discharging described above on the outer circumferential surface 8 of the roller main body 5.

Therefore, it is not possible to favorably charge the photoreceptor, and accumulated dust is adhered to formed images, which causes image defects.

On the other hand, when the average particle size of crosslinked PMMA particles exceeds the above range, the protrusions become too large, and when the photoreceptor is charged, particularly, in a discharge area on the upstream side of a nip part between the photoreceptor and the roller main body 5, abnormal discharge is likely to occur between the protrusions and the photoreceptor.

When abnormal discharge occurs, the surface of the photoreceptor may become scratched, and the scratches be reflected in the formed images, which causes image defects.

On the other hand, when crosslinked PMMA particles having an average particle size that is within the above range are selected and used, the surface roughness of the outer circumferential surface 8 of the roller main body 5 can be adjusted to be within a range in which adhesion and accumulation of dust are minimized.

In addition, the size of protrusions formed on the outer circumferential surface 8 of the roller main body 5 with the crosslinked PMMA particles can be adjusted to an appropriate size at which the surface of the photoreceptor can be favorably charged without generating abnormal discharge.

Therefore, it is possible to form an image having no image defects and favorable image quality.

<<Inner Layer 2>>
<Ethylene Propylene Rubber>

Examples of ethylene propylene rubbers include ethylene propylene rubber (EPM) which is a copolymer of ethylene and propylene and ethylene propylene diene rubber (EPDM) which is a copolymer of ethylene, propylene and diene. Particularly, EPDM is preferable.

Regarding an EPDM, various copolymers obtained by copolymerizing ethylene, propylene, and diene can be used. Examples of dienes include ethylidene norbornene (ENB) and dicyclopentadiene (DCPD).

Among these, examples of EPDM in which the diene is ENB include at least one of Esprene (registered trademark, commercially available from Sumitomo Chemical Co. Ltd.) EPDM 501A [content of ethylene: 52%, content of diene: 4.0%, non-oil extended], and 505A [content of ethylene: 50%, content of diene: 9.5%, non-oil extended].

In addition, examples of EPDMs in which the diene is DCPD include one, two, or more types from Esprene (commercially available from Sumitomo Chemical Co., Ltd.) and EPDM 301A [content of ethylene: 50%, content of diene: 5.0%, non-oil extended], 301 [content of ethylene: 62%, content of diene: 3.0%, non-oil extended], and 305 [content of ethylene: 60%, content of diene: 7.5%, non-oil extended].

In addition, in addition to the non-oil extended EPDMs exemplified above, as an EPDM, an oil-extended EPDM extended with extender oil is known. In the disclosure, among such oil-extended EPDMs, those in which the extender oil is a paraffin oil can be used as a substitute for EPDM+paraffin oil.

Regarding the EPDMs, one, two or more types of the above examples can be used.

(Other Rubbers)

In order to further improve the effects described above by combining ethylene propylene rubber, paraffin oil, and carbon black, regarding the rubber forming the inner layer 2, ethylene propylene rubber is preferably used alone (including a case in which two or more types of ethylene propylene rubber are used in combination).

However, other rubbers may be used in combination as long as the above effects are not impaired.

Regarding these other rubbers, for example, one, two, or more types of natural rubber, isoprene rubber, butadiene rubber, styrene butadiene rubber, acrylonitrile butadiene rubber, and chloroprene rubber can be used.

The content of other rubbers is preferably 20 parts by mass or less, particularly 10 parts by mass or less, with respect to 100 parts by mass of the total amount of rubbers.

<Paraffin Oil>

Regarding a paraffin oil, various paraffin oils having favorable compatibility with ethylene propylene rubber can be used.

Regarding the paraffin oil, for example, one, two or more types of various oils including the process oil PW series Diana (registered trademark, commercially available from Idemitsu Kosan Co., Ltd.) can be used.

The content of paraffin oil is preferably 40 parts by mass or more, particularly 60 parts by mass or more, and preferably 100 parts by mass or less, particularly 80 parts by mass or less with respect to 100 parts by mass of the total amount of rubbers including at least ethylene propylene rubber.

When the content is below the above range, sufficient effects of lowering the melt viscosity of the semiconductive rubber composition, improving effervescence, increasing a foaming rate, improving the flexibility of the inner layer 2, and consequently the flexibility of the roller main body 5 described above due to addition of paraffin oil may not be obtained.

On the other hand, when the content exceeds the above range, excess paraffin oil exudes on the outer circumferential surface 3 of the inner layer 2, that is, at an interface of the outer layer 4, electrical conduction between the outer layer 4 and the inner layer 2 is inhibited and the roller resistance value of the charging roller 1 is increased in some cases.

In addition, the outer layer 4 is more likely to be displaced with respect to the inner layer 2.

On the other hand, when the content of paraffin oil is set to be within the above range, it is possible to improve effervescence of the semiconductive rubber composition and increase the foaming rate while minimizing increase in the roller resistance value of the charging roller 1 and displacement of the outer layer 4 and the like.

In addition, it is possible to impart high flexibility to the inner layer 2, and consequently the roller main body 5.

Therefore, a sufficient nip width between the roller main body 5 and the photoreceptor is secured, and accordingly, the photoreceptor is favorably charged, it is possible to prevent the occurrence of image defects due to non-uniform charging more favorably, and it is possible further improve image quality of formed images.

As described above, when an oil-extended EPDM in which the extender oil is a paraffin oil is used as an EPDM, oil-extended EPDM with an oil-extended amount that is within the above range with respect to 100 parts by mass of EPDM may be selected and used.

When the oil-extended amount is insufficient, paraffin oil may be added. When the oil-extended amount is in excess, non-oil extended EPDM or EPDM with a small oil-extended amount may be added.

<Carbon Black>

Regarding carbon black, as described above, various types of carbon black having a DBP oil absorption amount of 400 cm$^3$/100 g or more and electron conductivity can be used.

Examples of the carbon black include Ketchen black (registered trademark, commercially available from Lion Specialty Chemicals) EC600JD [DBP oil absorption amount: 495 cm$^3$/100 g, granular form], and ECP600JD [DBP oil absorption amount: 495 cm$^3$/100 g, powder form].

In addition, a DBP oil absorption amount of carbon black is particularly preferably 600 cm³/100 g or less within the above range.

In the disclosure, a DBP oil absorption amount of carbon black is expressed by a value obtained by measurement according to a measurement method described in Japanese Industrial Standards JIS B6217-4:2008 "Carbon black for rubber—Basic characteristics—Part 4: A method of obtaining an oil absorption amount (including a compressed sample)."

The content of the carbon black is preferably 5 parts by mass or more, particularly 10 parts by mass or more, and preferably 20 parts by mass or less, particularly 15 parts by mass or less with respect to 100 parts by mass of the total amount of rubbers.

When the content of the carbon black is below the above range, a sufficient effect of lowering the roller resistance value of the charging roller 1 to a range suitable for the charging roller 1 by imparting semiconductivity to the semiconductive rubber composition may not be obtained.

On the other hand, when the content of the carbon black exceeds the above range, since the melt viscosity of the semiconductive rubber composition increases and effervescence is lowered, the foaming rate increases and a sufficient effect of improving the flexibility of the inner layer 2, and consequently the roller main body 5 may not be obtained.

On the other hand, when the content of the carbon black is set to be within the above range, favorable semiconductivity is imparted to the semiconductive rubber composition, and the roller resistance value of the charging roller 1 can be sufficiently lowered to a range suitable for the charging roller 1.

In addition, it is then possible to improve effervescence of the semiconductive rubber composition, increase the foaming rate, and impart high flexibility to the inner layer 2, and consequently the roller main body 5.

Therefore, a sufficient nip width between the roller main body 5 and the photoreceptor is secured, the photoreceptor is favorably charged, it is possible to prevent the occurrence of image defects due to non-uniform charging more favorably, and it is possible further improve image quality of formed images.

The semiconductive rubber composition forming the inner layer 2 can be prepared by additionally adding a foaming component for causing foaming so that the inner layer 2 has a porous structure, a crosslinking component for crosslinking rubber, and the like in predetermined proportions to the above components.

<Foaming Component>

Regarding the foaming component, a foaming agent that decomposes due to heating and generates a gas is preferably used.

(Foaming Agent)

Regarding the foaming agent, various compounds that decompose due to heating and generate a gas can be used.

Regarding the foaming agent, for example, one, two, or more types of 4,4'-oxybis (benzenesulfonyl hydrazide)) (OBSH), azodicarbonamide (ADCA), and N,N-dinitrosopentamethylenetetramine (DPT) can be used.

Particularly, OBSH is preferable.

In the case of OBSH, since decomposition gases dos not contain ammonia or formalin, it is possible to prevent the photoreceptor from being contaminated with such components. In addition, it is possible to reduce an environmental burden.

The content of the foaming agent such as OBSH is preferably 1 part by mass or more, particularly 6 parts by mass or more, and preferably 15 parts by mass or less, particularly 10 parts by mass or less with respect to 100 parts by mass of the total amount of rubbers.

When the content of the foaming agent is set to be within the above range, it is possible to cause the semiconductive rubber composition to be foamed favorably, increase the foaming rate, and improve the flexibility of the inner layer 2, and consequently the flexibility of the roller main body 5.

Therefore, a sufficient nip width between the roller main body 5 and the photoreceptor is secured, and accordingly, the photoreceptor is favorably charged, it is possible to prevent the occurrence of image defects due to non-uniform charging more favorably, and it is possible further improve image quality of formed images.

(Foaming Aid)

Regarding the foaming component, a foaming aid that lowers a decomposition temperature of a foaming agent and promotes decomposition of the foaming agent may be used in combination.

Regarding the foaming aid, various compounds that lower a decomposition temperature of a foaming agent to be incorporated and promote decomposition of the foaming agent may be exemplified.

Regarding the foaming aid, for example, when the foaming agent is OBSH or ADCA, a urea ($H_2NCONH_2$) foaming aid is preferable.

The content of the foaming aid is preferably 1 part by mass or more and preferably 5 parts by mass or less with respect to 100 parts by mass of the total amount of rubbers.

<Crosslinking Component>

Examples of the crosslinking component for crosslinking rubber include a crosslinking agent and a crosslinking promoter.

(Crosslinking Agent)

Examples of the crosslinking agent include one, two, or more types of a sulfur-based crosslinking agent, a thiourea-based crosslinking agent, a triazine derivative-based crosslinking agent, a peroxide crosslinking agent, various monomers, and the like.

Particularly, a sulfur-based crosslinking agent is preferable.

Examples of the sulfur-based crosslinking agent include sulfur such as sulfur powder, oil-treated sulfur powder, precipitated sulfur, colloidal sulfur, and dispersible sulfur and an organic-sulfur-containing compound such as tetramethylthiuram disulfide and N,N-dithiobismorpholine. Particularly, sulfur is preferable.

The content of sulfur is preferably 0.5 parts by mass or more and preferably 2 parts by mass or less with respect to 100 parts by mass of the total amount of rubbers.

When the content of sulfur is set to be within the range, it is possible to produce the inner layer 2 having appropriate flexibility suitable for use as a charging roller by crosslinking rubber favorably and having a small compression set with high productivity.

Here, for example, when oil-treated sulfur powder, dispersible sulfur, or the like is used as sulfur, the content is a proportion of sulfur itself as an active component contained therein.

In addition, when an organic-sulfur-containing compound is used as the crosslinking agent, the content is preferably adjusted so that the proportion of sulfur contained in molecules with respect to 100 parts by mass of the total amount of rubbers is within the above range.

(Crosslinking Promoter)

Examples of the crosslinking promoter to be incorporated with a sulfur-based crosslinking agent include one, two, or more types of an inorganic promoter such as hydrated lime, magnesia (MgO), and litharge (PbO) and an organic promoter.

In addition, examples of the organic promoter include one, two, or more types of a thiazole-based promoter, a thiuram-based promoter, a sulfenamide-based promoter, and a dithiocarbamate-based promoter.

Among these, a combination of a thiazole-based promoter and a thiuram-based promoter is preferably used.

Examples of the thiazole-based promoter include one, two, or more types of 2-mercaptobenzothiazole, di-2-benzothiazolyl disulfide, a zinc salt of 2-mercaptobenzothiazole, a cyclohexylamine salt of 2-mercaptobenzothiazole, 2-(N,N-diethylthiocarbamoylthio)benzothiazole, and 2-(4'-morpholinodithio)benzothiazole.

Particularly, di-2-benzothiazolyl disulfide is preferable.

In addition, examples of the thiuram-based promoter include one, two, or more types of tetramethylthiuram monosulfide, tetramethylthiuram disulfide, tetraethylthiuram disulfide, tetrabutylthiuram disulfide, tetrakis(2-ethylhexyl)thiuram disulfide, and dipentamethylene thiuram tetrasulfide.

Particularly, tetramethylthiuram monosulfide is preferable.

In a system using the above two types of crosslinking promoters in combination, in order to exhibit a sufficient effect of promoting a crosslinking reaction, the content of the thiazole-based promoter is preferably 1 part by mass or more and preferably 5 parts by mass or less with respect to 100 parts by mass of the total amount of rubbers.

In addition, the content of the thiuram-based promoter is preferably 0.5 parts by mass or more and preferably 2 parts by mass or less with respect to 100 parts by mass of the total amount of rubbers.

<Others>

Various additives may be additionally added to the semiconductive rubber composition as necessary.

Examples of the additive include a crosslinking promoting aid and a filling agent.

Among these, examples of the crosslinking promoting aid include one, two, or more types of a metal compound such as zinc oxide (zinc white); fatty acids such as stearic acid, oleic acid, and cotton seed fatty acid, and a crosslinking promoting aid known in the related art.

Individually, the content of the crosslinking promoting aid is preferably 0.1 parts by mass or more and preferably 7 parts by mass or less with respect to 100 parts by mass of the total amount of rubbers.

Examples of the filling agent include one, two, or more types of zinc oxide, silica, carbon black for reinforcement, clay, talc, calcium carbonate, magnesium carbonate, and aluminum hydroxide.

When the filling agent is added, it is possible to improve mechanical strength and the like of the inner layer 2.

The content of the filling agent is preferably 20 parts by mass or more and preferably 40 parts by mass or less with respect to 100 parts by mass of the total amount of the rubber component.

In addition, as the additive, additionally, various additives such as a plasticizer, a processing aid, a deterioration inhibitor, a scorching inhibitor, a lubricant, a pigment, an antistatic agent, a flame retardant, a neutralizing agent, a nucleating agent, and a co-crosslinking agent may be added in an arbitrary proportion.

<Inner Layer 2>

In order to form the inner layer 2 using a semiconductive rubber composition constituted by the above components, first, the prepared semiconductive rubber composition is extruded and molded into a cylindrical shape using an extruder, and then cut to a predetermined length, pressurized and heated in a vulcanizer to crosslink rubber and cause foaming.

Next, the crosslinked and foamed cylindrical component is heated using an oven or the like and subjected to secondary crosslinking, and is cooled, and the outer circumferential surface 3 is then polished to obtain a predetermined outer diameter.

Regarding the polishing method, various polishing methods, for example, dry traverse polishing, can be used.

<Shaft 7>

The shaft 7 is formed of a material with good conductivity, for example, a metal such as iron, aluminum, aluminum alloy, and stainless steel.

The shaft 7 can be inserted into and fixed to the through-hole 6 at any time from after the cylindrical component is cut until after the outer circumferential surface 3 of the inner layer 2 is polished.

However, after cutting, first, preferably, secondary crosslinking and polishing are performed while the shaft 7 is inserted into the through-hole 6.

Therefore, it is possible to minimize warping and deformation of the inner layer 2 due to expansion and contraction during secondary crosslinking. In addition, when polishing is performed while rotating around the shaft 7, it is possible to improve workability of the polishing and minimize deflection of the outer circumferential surface 3.

The shaft 7 having an outer diameter larger than the inner diameter of the through-hole 6 is press-fitted into the through-hole 6, or may be inserted into the through-hole 6 before secondary crosslinking using a thermosetting adhesive having conductivity.

In the former case, the shaft 7 is press-fitted, and at the same time, electrical connection and mechanical fixing to the inner layer 2 are completed.

In addition, in the latter case, a cylindrical component is subjected to secondary crosslinking due to heating in an oven and, and at the same time, a thermosetting adhesive is cured, and the shaft 7 is electrically connected and mechanically fixed to the inner layer 2.

In addition, using both methods in combination, the shaft 7 may be electrically connected and mechanically fixed to the roller main body.

<<Outer Layer 4>>

<Polyurethane Thermoplastic Elastomer>

Regarding the polyurethane thermoplastic elastomer, various polyurethane thermoplastic elastomers that have a urethane bond in the main chain and are thermoplastic, and have a type A durometer hardness of 93 or less at a measurement temperature of 23° C. as described above may be exemplified.

Particularly, a polyether type polyurethane thermoplastic elastomer classified according to the structure of the main chain is preferable.

Since the polyether type polyurethane thermoplastic elastomer is less likely to be hydrolyzed than a polyester type, for example, even in a high temperature and high humidity environment, the charging roller 1 can be continuously used for a long time without problems.

Examples of the polyether type polyurethane thermoplastic elastomer having a type A durometer hardness that is within the above range include one, two, or more types of ET870-11V [type A durometer hardness: 71±3], 1180A [type A durometer hardness: 80±2], ET880 [type A durometer hardness: 80±2], ET385 [type A durometer hardness: 85±2], ET885 [type A durometer hardness: 85±2], ET890A50S [type A durometer hardness: 90±2], and 1190ATR [type A durometer hardness: 91±2] among Elastllan (registered trademark, commercially available from BASF Japan) series.

In addition, in order to further improve the above effects, the type A durometer hardness of the polyurethane thermoplastic elastomer is preferably 90 or less, particularly 75 or less, within the above range.

However, when the type A durometer hardness of the polyurethane thermoplastic elastomer is less than 60, molding into a shape of the outer layer becomes difficult and dimensional accuracy cannot be guaranteed in some cases.

Therefore, the type A durometer hardness of the polyurethane thermoplastic elastomer is particularly preferably 60 or more within the above range.

<Carbon Black>

Regarding the carbon black, various types of carbon black having electron conductivity can be used.

However, in consideration of the mechanism for forming a conductive circuit described above, in order to impart favorable electron conductivity to the outer layer 4, a carbon black having a DBP oil absorption amount of 150 cm$^3$/100 g or more is preferably selected and used.

Compared to the inner layer 2, a lower limit of a DBP oil absorption amount of carbon black that can be used can be lowered. This is because the inner layer 2 has a porous structure and does not easily form a conductive circuit, but the outer layer 4 has a nonporous structure and can relatively easily form a conductive circuit.

Examples of a carbon black having a DBP oil absorption amount that is within the above range and having electron conductivity include Denka Black [DBP oil absorption amount:160 cm$^3$/100 g, commercially available from Denka Co., Ltd.).

In addition, carbon black added to the inner layer 2 described above can also be used.

The DBP oil absorption amount of carbon black is particularly preferably 600 cm$^3$/100 g or less within the above range.

The content of the carbon black is preferably 20 parts by mass or more, particularly 30 parts by mass or more, and preferably 60 parts by mass or less, particularly 70 parts by mass or less with respect to 100 parts by mass of the polyurethane thermoplastic elastomer.

When the content of the carbon black is below the above range, a sufficient effect of lowering the roller resistance value of the charging roller 1 to a range suitable for the charging roller 1 by imparting semiconductivity to the tube may not be obtained.

On the other hand, when the content of the carbon black exceeds the above range, the tube becomes hard and a sufficient effect of improving the flexibility of the roller main body 5 may not be obtained.

On the other hand, when the content of the carbon black is set to be within the above range, favorable semiconductivity is imparted to the tube, and the roller resistance value of the charging roller 1 can be sufficiently lowered to a range suitable for the charging roller 1.

In addition, it is possible to improve the flexibility of the tube and impart high flexibility to the roller main body 5.

Therefore, a sufficient nip width between the roller main body 5 and the photoreceptor is secured, the photoreceptor is favorably charged, it is possible to prevent the occurrence of image defects due to non-uniform charging more favorably, and it is possible further improve image quality of formed images.

<Crosslinked PMMA Particles>

Examples of the crosslinked PMMA particles include microparticles composed of a crosslinked product of polymethylmethacrylate.

The average particle size of the crosslinked PMMA particles needs to be 5 μm or more and 20 μm or less. The reason for this is as described above.

Examples of the crosslinked PMMA particles having an average particle size that is within the above range include one, two, or more types of MB30X-5 [average particle size: 5 μm], MB30X-12 [average particle size: 12 μm], and MB30X-20 [average particle size: 20 μm] among Tech polymer (registered trademark, commercially available from Sekisui Plastics Co., Ltd.) series.

Here, in order to further improve the above effects, the average particle size of the crosslinked PMMA particles is particularly preferably, 8 μm or more and preferably 16 μm or less within the above range.

The content of the crosslinked PMMA particles is preferably 1 part by mass or more, particularly 2 parts by mass or more and preferably 20 parts by mass or less, particularly 10 parts by mass or less with respect to 100 parts by mass of the polyurethane thermoplastic elastomer.

When the content of the crosslinked PMMA particles is below the above range, since the surface roughness of the outer circumferential surface 8 of the roller main body 5 is insufficient, dust easily adheres to and accumulates on the outer circumferential surface 8.

In addition, there is a tendency for appropriate protrusions serving as starting points for discharging to become unable to be sufficiently formed on the outer circumferential surface 8 of the roller main body 5.

Therefore, the photoreceptor cannot be favorably charged, and accumulated dust adheres to the formed images, which may cause image defects.

On the other hand, when the content of crosslinked PMMA particles exceeds the above range, the tube becomes hard and a sufficient effect of improving the flexibility of the roller main body 5 may not be obtained.

On the other hand, when the content of the crosslinked PMMA particles is set to be within the above range, appropriate protrusions serving as starting points for discharging can be formed on the outer circumferential surface 8 of the roller main body 5 with the crosslinked PMMA particles while the surface roughness of the outer circumferential surface 8 of the roller main body 5 is adjusted to a range in which adhesion and accumulation of dust are minimized.

In addition, it is possible to improve the flexibility of the tube and impart high flexibility to the roller main body 5.

Therefore, a sufficient nip width between the roller main body 5 and the photoreceptor is secured, the photoreceptor is favorably charged, it is possible to prevent the occurrence of image defects due to non-uniform charging more favorably, and it is possible further improve image quality of formed images.

<Tube, Outer Layer 4, Roller Main Body 5, and Charging Roller 1>

The charging roller 1 having the roller main body 5 including the outer layer 4 formed of the elastomer composition containing the above components and the inner layer 2 described above can be produced through, for example, the following process.

That is, first, the elastomer composition is extruded and molded into a cylindrical shape having a predetermined thickness and inner diameter and thereby a nonporous and seamless semiconductive tube is produced. The inner diameter of the tube is set to be substantially equal to the outer diameter of the inner layer 2, or set to be slightly smaller than the outer diameter of the inner layer 2.

Then, when the inner layer 2 in which the shaft 7 is inserted into and fixed to the through-hole 6 at its center in advance is press-fitted into the tube, the inner layer 2 and the tube are electrically connected and mechanically fixed, and the outer layer 4 formed of a tube is formed.

As a result, the charging roller 1 having the roller main body 5 having a 2-layer structure of the outer layer 4 and the inner layer 2 is produced.

Here, one or more optional intermediate layers may be interposed between the inner layer 2 and the outer layer 4.

However, in order to simplify the structure of the roller main body 5, as shown in the examples of FIGS. 1A and 1B, the roller main body 5 preferably has a 2-layer structure in which the inner layer 2 and the outer layer 4 are directly laminated.

The charging roller 1 of the disclosure is used by being incorporated into an image forming device using electrophotography, for example, a laser printer, an electrostatic copying machine, a plain paper facsimile machine, and a complex machine thereof.

EXAMPLES

While the disclosure will be described below in further detail with reference to examples and comparative examples, the configuration of the disclosure is not necessarily limited thereto.

<Evaluation of Abrasion Resistance>

In order to evaluate abrasion resistance of a material of forming a tube that forms an outer layer, test pieces 1 to 3 made of the following three types of thermoplastic elastomers for a wear test described in Japanese Industrial Standards JIS K7204:1999 "wear test method according to plastic-wear ring" were produced.

Test piece 1: polyurethane thermoplastic elastomer [polyether type, Elastllan ET870-11V commercially available from BASF Japan descried above, type A durometer hardness: 71±3]

Test piece 2: polyester thermoplastic elastomer [Hytrel (registered trademark) 7247 commercially available from Du Pont-Toray Co., Ltd., type D durometer hardness: 72]

Test piece 3: polyamide thermoplastic elastomer [UBESTA (registered trademark) 3030U commercially available from Ube Industries, Ltd., type D durometer hardness: 78] Using the above three types of test pieces, according to the above test method, a wear test was performed under conditions (wear ring: H22, load: 1 kgf ($\cong$9.8 N), the number of cycles: 1,000 cycles) and an amount of the mass decreased due to wearing was obtained. The results are shown in Table 1. Here, in the table, regarding symbols in the column of the type of the thermoplastic elastomer, PU indicates a polyurethane thermoplastic elastomer, PE indicates a polyester thermoplastic elastomer, and PA indicates a polyamide thermoplastic elastomer.

TABLE 1

| Sample No. | Thermoplastic elastomer | Amount reduced (mg) |
|---|---|---|
| 1 | PU | 3 |
| 2 | PE | 81 |
| 3 | PA | 75 |

Based on the results in Table 1, it was confirmed that the polyurethane thermoplastic elastomer had superior abrasion resistance to that of the other thermoplastic elastomers.

<Inner Layer (a)>
(Semiconductive Rubber Composition)

While masticating 100 parts by mass of EPDM [Esprene EPDM 505A commercially available from Sumitomo Chemical Co., Ltd. described above, content of ethylene: 50%, content of diene: 9.5%, non-oil extended] using a Banbury mixer, the following components were added and kneaded.

TABLE 2

| Components | Parts by mass |
|---|---|
| Paraffin oil | 70 |
| Carbon black | 12 |
| Foaming agent | 8 |
| Foaming aid | 2 |
| Crosslinking promoting aid I | 5 |
| Crosslinking promoting aid II | 1 |
| Filling agent | 30 |

The components in Table 2 are as follows. In addition, the parts by mass in the table are parts by mass with respect to 100 parts by mass of EPDM.

Paraffin oil: Diana process oil PW380 (commercially available from Idemitsu Kosan Co., Ltd. described above), kinematic viscosity at 100° C.: 30.86 mm$^2$/s, aniline point: 144° C.

Carbon black: Ketchen black EC600JD (commercially available from Lion Specialty Chemicals described above), DBP oil absorption amount: 495 cm$^3$/100 g.

Foaming agent: OBSH, Neocellborn N #10005 (commercially available from Eiwa Chemical Ind. Co., Ltd.), median diameter: 14 μm.

Foaming aid: urea type, Cell Paste 101 (commercially available from Eiwa Chemical Ind. Co., Ltd.).

Crosslinking promoting aid I: zinc oxide (commercially available from Mitsui Mining & Smelting Co., Ltd.).

Crosslinking promoting aid II: stearic acid (commercially available from NOF Corporation).

Filling agent: heavy calcium carbonate, BF-300 (commercially available from Shiroishi Calcium Kaisha. Ltd.), average particle size of 8.0

Next, while kneading was continued, the following crosslinking components were added and kneading was additionally performed to prepare a semiconductive rubber composition.

TABLE 3

| Components | Parts by mass |
|---|---|
| Crosslinking agent | 1.6 |
| Crosslinking promoter TS | 1.0 |
| Crosslinking promoter DM | 2.0 |

The components in Table 3 are as follows. In addition, the parts by mass in the table are parts by mass with respect to 100 parts by mass of EPDM.

Crosslinking agent: Golden flower 5% oil-filled fine sulfur powder (commercially available from Tsurumi Chemical Industry Co., Ltd.)

Crosslinking promoter TS: tetramethylthiuram monosulfide, Sanceler (registered trademark, commercially available from Sanshin Chemical Industry Co., Ltd.) TS, thiuram-based promoter.

Crosslinking promoter DM: di-2-benzothiazolyl disulfide, SUNSINE MBTS (commercially available from Shandong Shanxian Chemical), thiazole-based promoter.

(Inner Layer)

The semiconductive rubber composition was supplied to an extrusion molding machine, extruded and molded into a cylindrical shape with an outer diameter of φ 10 mm and an inner diameter of φ 4 mm, attached to a temporary shaft for crosslinking, and crosslinked and foamed in a vulcanizer at 160° C. for 1 hour.

Next, the crosslinked and foamed cylindrical component was re-attached to a shaft having an outer circumferential surface to which a conductive thermosetting adhesive was applied and having an outer diameter of φ 6.0 mm and heated in an oven at 160° C. and bonded to the shaft.

Then, the outer circumferential surface was polished using a cylindrical polishing machine and finished so that the outer diameter was φ 11.5 mm, and an inner layer (a) integrated with the shaft was produced.

<Inner Layer (b)>

A semiconductive rubber composition was prepared in the same manner as in the inner layer (a) except that, as carbon black, 100 parts by mass of a carbon black having a DBP oil absorption amount of 160 $cm^3$/100 g [Denka black granule commercially available from Denka Co., Ltd. described above] was added, and an amount of paraffin oil added was 100 parts by mass, and thereby an inner layer (b) integrated with the shaft was produced.

<Tube (A)>
(Elastomer Composition)

100 parts by mass of a polyurethane thermoplastic elastomer [polyether type, Elastllan ET870-11V commercially available from BASF Japan described above, type A durometer hardness: 71±3], 40 parts by mass of carbon black [Denka black granule commercially available from Denka Co., Ltd. described above, DBP oil absorption amount:160 $cm^3$/100 g], and 3 parts by mass of crosslinked PMMA particles [Tech polymer MB30X-5 commercially available from Sekisui Plastics Co., Ltd. described above, average particle size: 5 μm] were kneaded using a twin-screw extruder to prepare an elastomer composition.

(Tube)

The elastomer composition was supplied to the extruder and extruded and molded into a cylindrical shape with an outer diameter of φ 12 mm and an inner diameter of φ 11.2 mm, and thereby a tube (A) forming the outer layer was produced.

<Tube (B)>

An elastomer composition was prepared in the same manner as in the tube (A) except that the same amount of crosslinked PMMA particles having an average particle size of 12 μm [Tech polymer MB30X-12 commercially available from Sekisui Plastics Co., Ltd. described above] was added and thereby a tube (B) was produced.

<Tube (C)>

An elastomer composition was prepared in the same manner as in the tube (A) except that the same amount of crosslinked PMMA particles having an average particle size of 20 μm [Tech polymer MB30X-20 commercially available from Sekisui Plastics Co., Ltd. described above] was added, and thereby a tube (C) was produced.

<Tube (D)>

An elastomer composition was prepared in the same manner as in the tube (B) except that the same amount of a polyurethane thermoplastic elastomer having a type A durometer hardness of 90±2 [polyether type, Elastllan ET890A50S commercially available from BASF Japan described above] was added, and thereby a tube (D) was produced.

<Tube (E)>

An elastomer composition was prepared in the same manner as in the tube (B) except that 50 parts by mass of a carbon black having a DBP oil absorption amount of 114 $cm^3$/100 g [Seast 6 commercially available from Tokai Carbon Co., Ltd.] was added, and thereby a tube (E) was produced.

<Tube (F)>

An elastomer composition was prepared in the same manner as in the tube (B) except that the same amount of a polyurethane thermoplastic elastomer having a type D durometer hardness of 56±3 [polyether type, Elastllan ET856D50 commercially available from BASF Japan] was added, and thereby a tube (F) was produced.

<Tube (G)>

An elastomer composition was prepared in the same manner as in the tube (A) except that the same amount of crosslinked PMMA particles having an average particle size of 30 μm [Tech polymer MB30X-30 commercially available from Sekisui Plastics Co., Ltd.] was added, and thereby a tube (G) was produced.

<Tube (H)>

An elastomer composition was prepared in the same manner as in the tube (A) except that the same amount of crosslinked PMMA particles having an average particle size of 1 μm [Tech polymer SSX-101 commercially available from Sekisui Plastics Co., Ltd.] was added, and thereby a tube (H) was produced.

<Tube (I)>

An elastomer composition was prepared in the same manner as in the tube (A) except that no crosslinked PMMA particles were added, and thereby a tube (I) was produced.

<Tube (J)>

An elastomer composition was prepared in the same manner as in the tube (B) except that the same amount of a polyamide thermoplastic elastomer [UBESTA (registered trademark, commercially available from Ube Industries, Ltd.)] 3030U, type D durometer hardness:78] was added in place of the polyurethane thermoplastic elastomer, and an amount of carbon black added was 45 parts by mass, and thereby a tube (J) was produced.

Examples 1 to 5, and Comparative Examples 1 to 6

The inner layer (a) or (b), and any of the tubes (A) to (J) were combined as shown in the following Table 4 and Table 5 to produce charging rollers.

That is, the inner layer (a) or (b) was press-fitted into any of the tubes (A) to (J), and both ends were then shaped to form a roller main body, and thereby a charging roller was produced.

<Asker C Type Hardness of Roller Main Body>

The Asker C type hardnesses at 23° C. of the roller main bodies of the charging rollers produced in the examples and the comparative examples were measured using a type C hardness tester (for example, Asker rubber hardness tester C type (commercially available from Kobunshi Keiki Co., Ltd.) according to Japan Rubber Association Standards SRIS0101 "physical test method for expanded rubber" incorporated in Annex 2 of Japanese Industrial Standards JIS $K7312_{-1996}$ "physical test method for thermosetting polyurethane elastomer molded article."

That is, while both ends of the shaft inserted into and fixed to the roller main body was fixed to a support table, a needle of the type C hardness tester was pushed to the center of the roller main body, and additionally a load of 1 kgf (≈9.8N) was applied to measure the Asker C type hardness.

<Actual Machine Test>

The charging rollers produced in the examples and the comparative examples were incorporated into a toner cartridge [black, TC-C4CK2] of a color laser printer [CORE-FIDO (registered trademark, commercially available from Oki Electric Industry Co., Ltd.) 2 C712dnw)] in place of a genuine charging roller.

Then, the toner cartridge was loaded in the color Laser printer, under an environment with a temperature of 23±1° C. and a relative humidity of 55±1%, 11,000 images with a density of 5% were continuously formed, the formed images were observed, and image quality of the formed images was evaluated according to the following criteria.

⊚: No image defects were observed at all in the 11,000 images formed.

○: Although very slight image defects were observed, there was no problem in practical use.

x: Image defects causing a problem in practical use were observed.

In addition, after images were continuously formed, the charging roller was removed, the outer circumferential surface was visually observed, and it was evaluated whether there was dust on the charging roller according to the following criteria.

⊚: No dust was observed at all on the outer circumferential surface of the charging roller.

○: Although very slight dust was observed, there was no problem in practical use.

x: Dust causing a problem in practical use was observed.

The above results are shown in Table 4 and Table 5. Here, in the table, regarding symbols in the column of the type of the thermoplastic elastomer, PU indicates a polyurethane thermoplastic elastomer and PA indicates a polyamide thermoplastic elastomer. In addition, regarding the numerical values in the column of the hardness of the thermoplastic elastomer, only the center value is described, and "A" is added after the numerical value in the case of the type A durometer hardness and "D" is added after the numerical value in the case of the type D durometer hardness for distinction.

TABLE 4

| | | | Example 1 | Example 2 | Example 3 | Example 4 | Example 5 |
|---|---|---|---|---|---|---|---|
| Inner layer | Type | | a | a | a | a | a |
| | Carbon black | DBP oil absorption amount (cm³/100 g) | 495 | 495 | 495 | 495 | 495 |
| | | Parts by mass | 12 | 12 | 12 | 12 | 12 |
| Outer layer | Type | | A | B | C | D | E |
| | Thermoplastic elastomer | Type | PU | PU | PU | PU | PU |
| | | Hardness | 71A | 71A | 71A | 90A | 71A |
| | Carbon black | DBP oil absorption amount (cm³/100 g) | 160 | 160 | 160 | 160 | 114 |
| | | Parts by mass | 40 | 40 | 40 | 40 | 50 |
| | Crosslinked PMMA particles | Average particle size (μm) | 5 | 12 | 20 | 12 | 12 |
| | | Parts by mass | 3 | 3 | 3 | 3 | 3 |
| Evaluation | Asker C type hardness | | 40 | 40 | 40 | 56 | 44 |
| | Image quality of formed image | | ○ | ⊚ | ○ | ○ | ○ |
| | Dust on charging roller | | ○ | ⊚ | ⊚ | ⊚ | ⊚ |

TABLE 5

| | | | Comparative Example 1 | Comparative Example 2 | Comparative Example 3 | Comparative Example 4 | Comparative Example 5 | Comparative Example 6 |
|---|---|---|---|---|---|---|---|---|
| Inner layer | Type | | a | b | a | a | a | a |
| | Carbon black | DBP oil absorption amount (cm³/100 g) | 495 | 160 | 495 | 495 | 495 | 495 |
| | | Parts by mass | 12 | 100 | 12 | 12 | 12 | 12 |
| Outer layer | Type | | F | B | G | H | I | J |
| | Thermoplastic elastomer | Type | PU | PU | PU | PU | PU | PA |
| | | Hardness | 56D | 71A | 71A | 71A | 71A | 78D |
| | Carbon black | DBP oil absorption amount (cm³/100 g) | 160 | 160 | 160 | 160 | 160 | 160 |
| | | Parts by mass | 40 | 40 | 40 | 40 | 40 | 45 |

TABLE 5-continued

|  |  |  | Comparative Example 1 | Comparative Example 2 | Comparative Example 3 | Comparative Example 4 | Comparative Example 5 | Comparative Example 6 |
|---|---|---|---|---|---|---|---|---|
|  | Crosslinked PMMA particles | Average particle size (μm) | 12 | 12 | 30 | 1 | — | 12 |
|  |  | Parts by mass | 3 | 3 | 3 | 3 | — | 3 |
| Evaluation | Asker C type hardness |  | 85 | 83 | 40 | 40 | 39 | Greater than 100 |
|  | Image quality of formed image |  | X | X | X | X | X | X |
|  | Dust on charging roller |  | ⊚ | ⊚ | ⊚ | X | X | ⊚ |

In Comparative Example 1 in which the outer layer was formed of a hard polyurethane thermoplastic elastomer having a type A durometer hardness of greater than 93, since the flexibility of the roller main body deteriorated, it was not possible to secure the nip width, and it was not possible to favorably charge the photoreceptor, image defects occurred in the formed images due to non-uniform charging.

Also in Comparative Example 2 in which a large amount of a carbon black having a DBP oil absorption amount of less than 400 cm$^3$/100 g was added to the inner layer, since the flexibility of the roller main body also deteriorated, it was not possible to secure the nip width, and it was not possible to favorably charge the photoreceptor, image defects occurred in the formed images due to non-uniform charging.

In Comparative Example 3 in which crosslink PMMA particles having an average particle size of greater than 20 μm was added, since protrusions formed on the outer circumferential surface of the roller main body were large, abnormal discharge occurred between the protrusions during charging, and the surface of the photoreceptor became scratched, the scratches were reflected and image defects occurred in the formed images.

In Comparative Example 4 in which crosslink PMMA particles having an average particle size of less than 5 μm was added, since the surface roughness of the outer circumferential surface of the roller main body was small, dust adhered to the outer circumferential surface and image defects occurred in the formed images due to the adhered dust.

In Comparative Example 5 in which crosslinked PMMA particles were not added to the outer layer, since the surface roughness of the outer circumferential surface of the roller main body was smaller, a larger amount of dust adhered to the outer circumferential surface, and image defects occurred in the formed images due to the adhered dust.

In Comparative Example 4 in which the outer layer was formed of the polyamide thermoplastic elastomer, since the flexibility of the roller main body also deteriorated, it was not possible to secure the nip width, and it was not possible to favorably charge the photoreceptor, non-uniform charging occurred. In addition, the outer layer was too hard, and the surface of the photoreceptor became scratched. Therefore, the scratches and non-uniform charging were reflected, and image defects occurred in the formed images.

On the other hand, in all of Examples 1 to 5, neither dust nor image defects on the outer circumferential surface of the roller main body were observed.

Thus, based on these results, it was found that, when the inner layer having a porous structure formed of the semiconductive rubber composition constituted by ethylene propylene rubber, paraffin oil, and a carbon black having a DBP oil absorption amount of 400 cm$^3$/100 g or more and the outer layer formed of the nonporous and seamless semiconductive tube including a polyurethane thermoplastic elastomer having a type A durometer hardness of 93 or less, carbon black, and crosslinked poly(methyl methacrylate) particles having an average particle size of 5 to 20 μm were combined, it was possible to produce a charging roller having various characteristics which are improved with respect to the current situation.

In addition, it was also found that EPDM was preferable as the ethylene propylene rubber, OBSH was preferable as the foaming agent of the inner layer, and the polyether type was preferable as the polyurethane thermoplastic elastomer.

In addition, based on the results of Examples 1 to 5, it was found that, in order to further improve the above effects, the average particle size of the crosslinked PMMA particles contained in the outer layer was preferably 8 μm or more and preferably 16 μm or less, and the polyurethane thermoplastic elastomer forming the outer layer preferably had a type A durometer hardness of 75 or less, and the carbon black contained in the outer layer preferably had a DBP oil absorption amount of 150 cm$^3$/100 g or more.

What is claimed is:

1. An image forming apparatus comprising a charging roller for charging a photoreceptor, and the charging roller comprising:
    a roller main body including a cylindrical inner layer having a porous structure formed of a semiconductive rubber composition constituted by ethylene propylene rubber, paraffin oil, and a carbon black having a DBP oil absorption amount of 400 cm$^3$/100 g or more, and an outer layer which is provided on the outer circumference of the inner layer and constituted by a nonporous and seamless semiconductive tube including a polyurethane thermoplastic elastomer having a type A durometer hardness according to Japanese Industrial Standards JIS K7311$_{-1995}$ of 60 or more and 75 or less at a measurement temperature of 23° C., carbon black, and crosslinked poly(methyl methacrylate) particles having an average particle size of 5 μm or more and 20 μm or less.

2. The image forming apparatus according to claim 1, wherein the ethylene propylene rubber is ethylene propylene diene rubber.

3. The image forming apparatus according to claim 1, wherein the inner layer has a porous structure formed by thermal decomposition of 4,4'-oxybisbenzenesulfonyl hydrazide as a foaming agent.

4. The image forming apparatus according to claim 1, wherein the polyurethane thermoplastic elastomer is a polyether type polyurethane thermoplastic elastomer.

5. The image forming apparatus according to claim 1, wherein the carbon black contained in the outer layer has a DBP oil absorption amount of 150 cm$^3$/100 g or more.

6. A method of producing the charging roller in the image forming apparatus according to claim 1, comprising:
a process in which the inner layer is foamed by thermal decomposition of 4,4'-oxybisbenzenesulfonyl hydrazide as a foaming agent contained in the semiconductive rubber composition such that it has a porous structure.

7. The image forming apparatus according to claim 2, wherein the inner layer has a porous structure formed by thermal decomposition of 4,4'-oxybisbenzenesulfonyl hydrazide as a foaming agent.

8. The image forming apparatus according to claim 2, wherein the polyurethane thermoplastic elastomer is a polyether type polyurethane thermoplastic elastomer.

9. The image forming apparatus according to claim 3, wherein the polyurethane thermoplastic elastomer is a polyether type polyurethane thermoplastic elastomer.

10. The image forming apparatus according to claim 2, wherein the carbon black contained in the outer layer has a DBP oil absorption amount of 150 cm$^3$/100 g or more.

11. The image forming apparatus according to claim 3, wherein the carbon black contained in the outer layer has a DBP oil absorption amount of 150 cm$^3$/100 g or more.

12. The image forming apparatus according to claim 4, wherein the carbon black contained in the outer layer has a DBP oil absorption amount of 150 cm$^3$/100 g or more.

13. A method of producing the charging roller in the image forming apparatus according to claim 2, comprising:
a process in which the inner layer is foamed by thermal decomposition of 4,4'-oxybisbenzenesulfonyl hydrazide as a foaming agent contained in the semiconductive rubber composition such that it has a porous structure.

14. A method of producing the charging roller in the image forming apparatus according to claim 3, comprising:
a process in which the inner layer is foamed by thermal decomposition of 4,4'-oxybisbenzenesulfonyl hydrazide as a foaming agent contained in the semiconductive rubber composition such that it has a porous structure.

15. A method of producing the charging roller in the image forming apparatus according to claim 4, comprising:
a process in which the inner layer is foamed by thermal decomposition of 4,4'-oxybisbenzenesulfonyl hydrazide as a foaming agent contained in the semiconductive rubber composition such that it has a porous structure.

\* \* \* \* \*